(Model.)
C. E. DIXON.
EDGE TOOL TEMPERING POT.
No. 256,201. Patented Apr. 11, 1882.
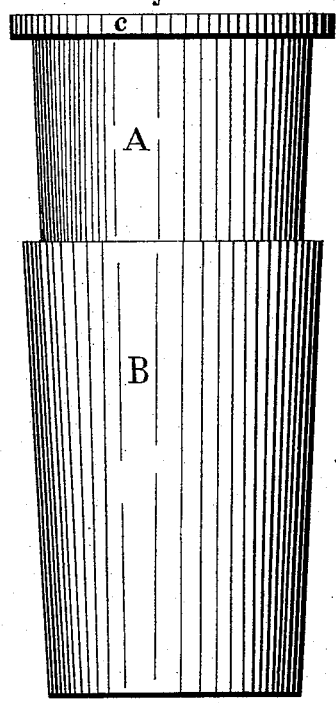
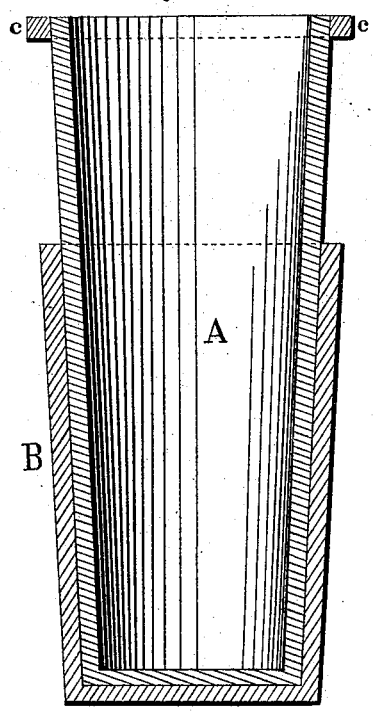
Witnesses.
R. E. Nelson
K. Steele
Inventor.
Charles E. Dixon,
Chas. B. Steele
Attorney.

United States Patent Office.

CHARLES E. DIXON, OF PITTSBURG, PENNSYLVANIA.

EDGE-TOOL-TEMPERING POT.

SPECIFICATION forming part of Letters Patent No. 256,201, dated April 11, 1882.

Application filed February 28, 1882. (Model.)

*To all whom it may concern:*

Be it known that I, CHARLES E. DIXON, a citizen of the United States, residing at Pittsburg, in the county of Allegheny and State of Pennsylvania, have invented certain new and useful Improvements in Tempering Pans or Pots for Tempering Edge-Tools; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of my device is a side view, and Fig. 2 is a vertical section of the same.

My invention is an improved tempering-pot for tempering edge-tools; and it consists of the following peculiar features: a wrought-iron cylindrical shell closely inclosing the wrought-iron tempering-pot within, and having around its upper end and welded thereon a wrought-iron ring or band, all of which, and their purposes and results, are hereinafter more particularly described, and illustrated by the accompanying drawings, in which the same letters designate identical parts in the different figures.

A represents a tempering-pot, of the usual form and size, constructed of wrought or forged iron, which not only makes said pot, in comparison with its size, of much less weight, but much tougher in substance, and less liable to crack or split while enduring high degrees of temperature than one constructed of cast-iron in the usual manner. Besides the above, in order to still further protect the said pot A from warpage and the disintegrating effect of the furnace-fire, it is tightly inclosed, about three-fourths of its height or length, within an outer cylindrical pot or shell, B, made also of wrought or forged iron. The purposed results of this kind of covering-shell are, first, that the inner or tempering pot, A, is completely protected from immediate contact with the fire, and consequently far outlasts the usual ones; second, that when the outer pot or shell, B, is nearly burned or worn away the remaining portions can be removed and another similar shell-cover be fastened around, as aforesaid, to supply its place, thus adding to the lasting quality of the inner pot; and, finally, that great beneficial effect is imparted to the tempering contents of the inner pot by the said double shells or pots A and B being constructed of wrought-iron—to wit, an evenly-concentrating heat permeates the said tempering-fluids within the inner pot, resulting in the more thorough and even distribution of the tempering qualities of said fluids to the metallic substance of the tool undergoing process, as shown by the quick and certain indication of the designative color evenly spread over the surface of the tempered metal.

*c* represents the aforesaid wrought-iron ring or band, which is tightly forged around the upper end of the pot A. The run of the fibers of said ring being across those of the pot A, there result an even and counterbalancing expansion and contraction of the metal of said pot undergoing the effects of changing degrees of heat, thus preventing any splitting of the sides or edges of the tempering-pot.

Having fully described my invention, what I claim, and desire to secure by Letters Patent, is—

The wrought-iron tempering-pot A, tightly inclosed within the wrought-iron protecting-shell B, and having the wrought-iron band *c* tightly forged around its upper end, all constructed and combined as and for the purposes herein specified.

In testimony whereof I affix my signature in presence of two witnesses.

CHAS. E. DIXON.

Witnesses:
ROBT. HAYSMITH,
DAVID LARNED.